United States Patent [19]

Yamada et al.

[11] Patent Number: 4,880,986
[45] Date of Patent: Nov. 14, 1989

[54] SYSTEM FOR MEASURING RADIATION DOSES USING FLUORESCENT DOSEMETERS

[75] Inventors: Junji Yamada, Yokohama; Yasushi Mawatari, Shizuoka; Toru Ikegami, Shimada; Koichi Nishio; Motoyuki Sato, both of Shizuoka, all of Japan; Bertram Burgkhardt, Karlsruhe, Fed. Rep. of Germany; Ernst Piesch, Eggenstein-Leopoldshafen, Fed. Rep. of Germany; Siegfried Ugi, Weingarten, Fed. Rep. of Germany

[73] Assignees: Toshiba Glass Co., Ltd., Shizuoka, Japan; Kernforschungszentrum Karlsruhe GmbH, Karlsruhe, Fed. Rep. of Germany

[21] Appl. No.: 250,245

[22] Filed: Sep. 28, 1988

[30] Foreign Application Priority Data

Feb. 18, 1988 [JP] Japan ................................. 63-34073

[51] Int. Cl.$^4$ .............................................. G01T 1/06
[52] U.S. Cl. ............................. 250/484.1; 250/327.01
[58] Field of Search ................. 250/484.1 C, 484.1 R, 250/327.2 R, 484.1 B

[56] References Cited

FOREIGN PATENT DOCUMENTS 50-38352  5/1975  Japan .
59-190681 11/1984  Japan .
61-292582 12/1986  Japan .

OTHER PUBLICATIONS

König, W., "A New Automatic Computerized Phosphate Glass Reader . . . ", Rad. Protect Dosimetry, vol. 1, No. 1, (1981), pp. 43–49.

"Fluoroglass Dosimeter Reader Utilizing $N_2$–Gas Laser Excitation", Takao Omori et al., Toshiba Review vol. 39, UCD 621.389.038.6, pp. 247–250; 1984.

"Properties of Radiophotoluminescent Glass Dosemeter Systems Using Pulsed Laser UV Excitation", Radiation Protection Dosimetry, vol. 17, pp. 293–297, (1986).

Primary Examiner—Janice A. Howell
Assistant Examiner—Richard Hanig
Attorney, Agent, or Firm—Oblon, Spivak, McClelland, Maier & Neustadt

[57] ABSTRACT

A radiation dose measuring system using fluorescent dosemeters comprises fluorescent dosemeters including fluorescent glass elements having a fluorescent detection surface, a magazine capable of holding a predetermined number of fluorescent dosemeters, a magazine conveying device for conveying a magazine of a plurality of magazines fed one by one such that is predetermined segment is located to a take-out position, a fluorescent dosemeter take-out device for taking the fluorescent dosemeter from the magazine located in a predetermined position, a fluorescent glass element setting device for moving the fluorescent glass element to a predetermined measuring position and a dose measuring device for subjecting the fluorescent glass element which is set to a measuring position to an ultraviolet ray and for measuring an intensity of fluorescent light which is emitted from an excited glass element.

6 Claims, 14 Drawing Sheets

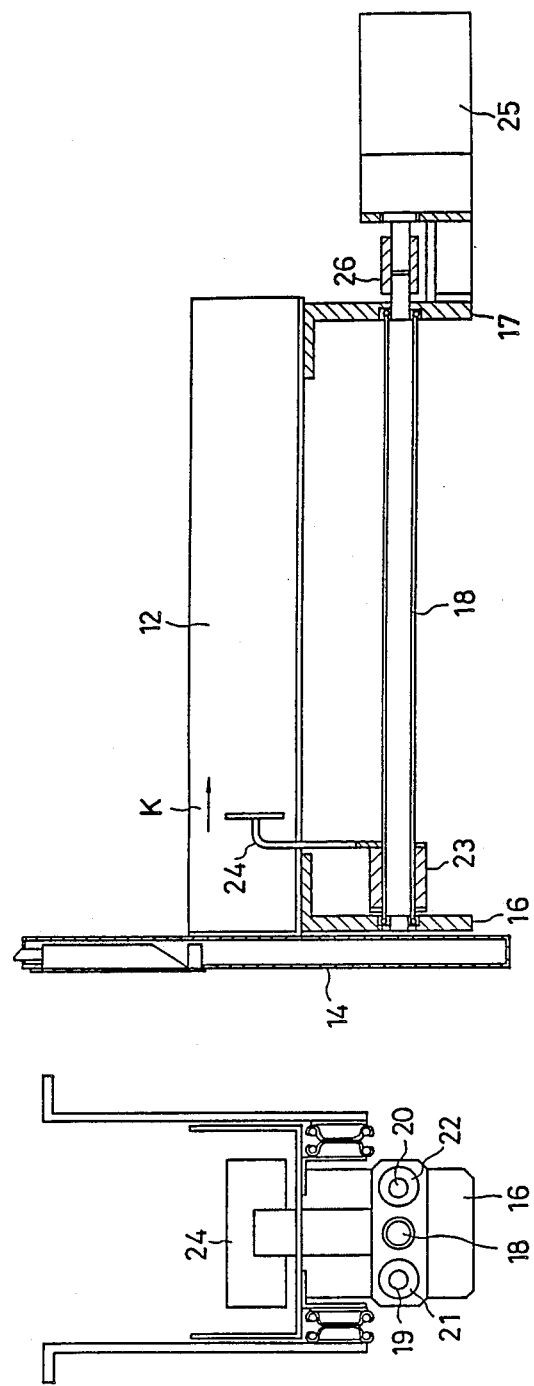
F I G. 2B
F I G. 2A

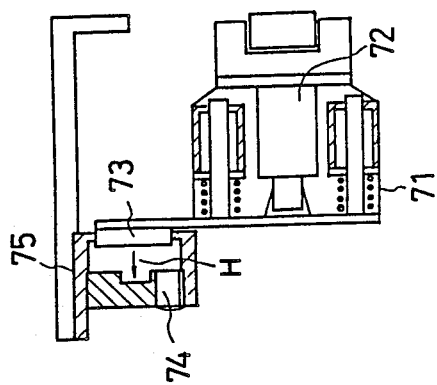
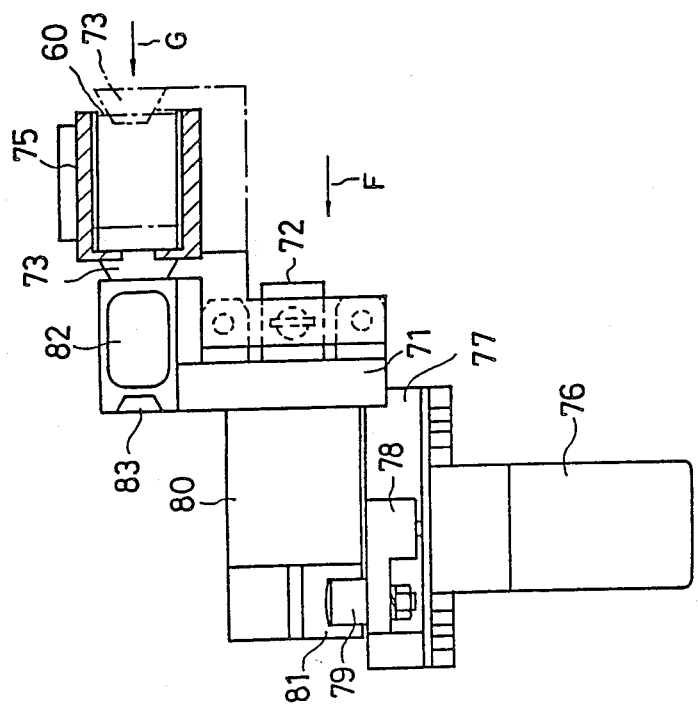
FIG. 7B
FIG. 7A

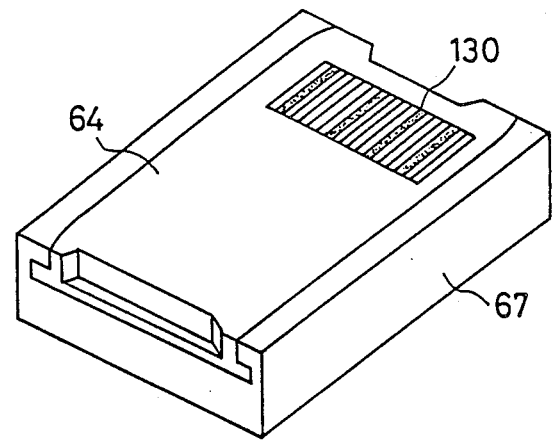
F I G. 15
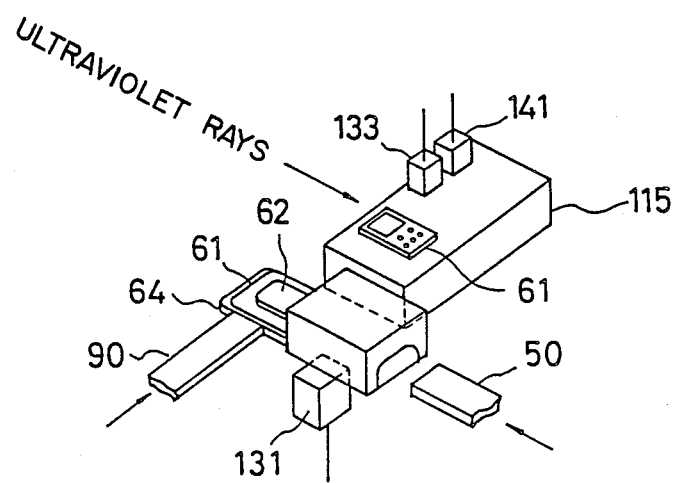
F I G. 16

SYSTEM FOR MEASURING RADIATION DOSES USING FLUORESCENT DOSEMETERS

BACKGROUND OF THE INVENTION

1. Field of the Invention

The present invention relates to a system for measuring radiation doses using fluorescent dosemeters and, in particular, an improved radiation dose measuring system capable of continuously processing many items of dose data with the use of a greater number of fluorescent dosemeters.

2. Description of the Related Art

In general, a living body is exposed to greater danger in proportion to the amount of energy it absorbs from radiation, i.e., a radiation dose. Therefore, persons who work in installing an atomic reactor, an accelerator, an X-ray generator, a radioisotope source, or the like must be perfectly protected from radiation. The operators and users of these apparatuses should be subjected to high-precision measurement of exposure radiation dose. For this reason, it is extremely important to read the radiation doses measured by dosemeters and appropriately manage the data representing the radiation doses.

Photoluminescence dosemeters of this type each comprise a fluorescent glass element (hereinafter referred to as "glass element"), a glass element holder (hereinafter referred to as "glass holder") holding the glass element, and upper and lower capsule cases for enclosing the glass holder. During the use of the dosemeters, the capsules, each being the capsule cases put together and containing the glass holder, are carried by persons, or are set at proper locations. In order to measure radiation doses from these dosemeters, the capsules are inserted, one after another, into an apparatus for measuring the radiation doses.

A conventional apparatus for measuring radiation doses from such dosemeters has a measuring section provided with a cover and a drive unit. A turntable is rotatably provided within the measuring section. Radiation doses are measured from the dosemeters in the following way. First, the drive unit is operated, thus rotating the turntable at a predetermined speed, either before or after the cover is opened. Then, the glass holders are manually pulled out of the respective dosemeters. Further, the glass elements are manually drawn out of the respective glass holders, and sequentially inserted into the holders mounted on the turntable. These glass elements are moved as the turn table is rotated. When any glass element reaches a predetermined position, it is excited with ultraviolet rays. As a result, the glass element emits fluorescent light. The intensity of this light is measured by means of a photomultiplier tube.

In the above-mentioned method of measuring radiation doses from individual dosemeters, manual operations are required to pull the glass holders from the respective dosemeters, to draw the glass elements from the respective glass holders, and to set the glass elements on the turntable. Hence, the method is complex, and it inevitably takes a long time to measure the radiation doses from the dosemeters. In other words, it is impossible with the above-mentioned method to measure radiation doses from dosemeters, quickly or continuously. Further, since the glass elements are small, it is cumbersome for people to draw a glass element out of each glass holder and then set it on the turntable. For the same reason it is also difficult to automate this troublesome operation of drawing the glass elements from the respective dosemeters.

Hitherto, in managing the radiation exposure doses of persons who are exposed to radiation during their work, these persons carry a capsule containing a glass holder holding a glass element while working. After work, or upon lapse of a predetermined period of time, the glass holder is removed from the capsule and attached to a radiation dose reader, thereby to measure the radiation dose of each person. The center of the fluorescence, which is generated due to the exposure to radiation, is relatively stable. In addition, the fluorescence does not attenuate much; it continues unless or until a specific process is performed on the glass element. Therefore, the glass element can be repeatedly used, and the radiation dose accumulated in the glass element by the repeated use thereof can be measured. Besides, the radiation dose is read from the glass element at predetermined intervals, and each reading is recorded in a record file, so that the radiation exposure dose for each period can be obtained by subtracting any reading from the immediately previous reading.

However, it is very cumbersome to read the radiation dose from each glass element at the predetermined intervals, and to record each reading in the record file, together with the data of measuring the radiation dose. To take any reading from the previous one, thereby to obtain the radiation dose for a specific period, is no doubt equally cumbersome.

SUMMARY OF THE INVENTION

In view of these considerations it is an object of the present invention to provide a radiation dose measuring system using fluorescent dosemeters in which it can effect a continuous conveyance of dosemeters and an automatic withdrawal of glass element holders and can set the glass element holder in a predetermined measuring position so that the radiation doses of the fluorescent glass elements can be measured automatically and continuously.

It is a further object of the present invention to provide a radiation dose measuring system with the use of fluorescent dosemeters, which can evaluate a dose level, a total dose level and so on over a predetermined interval for the respective dosemeters and readily control the dose level as a desired level.

It is another object of the present invention to provide a radiation dose measuring system with the use of fluorescent dosemeters, which can evaluate a dose quality or energy of a γ-and X-rays on one glass element.

It is also an object of the present invention to provide a radiation dose measuring system with the use of fluorescent dosemeters, which can automatically and continuously calibrate a dose level with the use of standard fluorescent glass elements for calibration.

It is a related object of the present invention to provide a radiation dose measuring system with the use of fluorescent dosemeters which, when a storage dose level exceeds a predetermined level, can automatically replace an involved fluorescent glass element with a new one.

To achieve the aforementioned object, a radiation dose measuring system for measuring a radiation dose with an intensity of fluorescent light emitted due to an excitation of a fluorescent glass element on a fluorescent dosemeter which is exposed with a radiation, comprises:

a fluorescent dosemeter including a fluorescent glass element having a fluorescent detection surface, a glass holder having an opening through which the fluorescent detection section is subjected to an exposure and holding the fluorescent glass element, and a capsule for holding the glass holder, said capsule comprising an inner case slidably receiving or withdrawing the glass holder and an outer case slidably receiving the inner case to allow it to be detachably mounted thereon;

at least one magazine capable of receiving a required number of fluorescent dosemeters, the magazine being divided into a predetermined number of segments and the fluorescent dosemeter being adapted to be received in the respective segment;

a magazine conveying device for allowing a predetermined segment of one of magazines fed one by one to be located in a predetermined position;

a fluorescent dosemeter take-out device for taking the fluorescent dosemeter from the segment of the magazine located in a take-out position and for receiving the magazine;

a fluorescent glass element setting device which, in the taken fluorescent dosemeter, moves the fluorescent glass element to permit it to be located in a predetermined measuring position; and a dose measuring device for subjecting the fluorescent glass element, which is set in a measuring position, to an ultraviolet ray.

The system further comprises dose quality evaluation means including an energy compensation filter having an opening in a predetermined position on said fluorescent dosemeter and a plurality of diaphragms each having a varying opening area of said fluorescent detection surface at an area corresponding to the opening of said filter.

The system according to the present invention further comprises a dose measurement calibrating device including a reference fluorescent glass element for calibration, and a conveying table for replacing the fluorescent glass element of said fluorescent glass dosemeter with the calibration fluorescent glass element in a predetermined measuring position.

Another radiation dose measuring system for measuring a radiation dose with an intensity of fluorescent light emitted due to an excitation by an ultraviolet ray in a fluorescent element on a fluorescent dosemeter, comprises:

a fluorescent dosemeter including an identifying section for recording an identification information, said fluorescent dosemeter including a fluorescent glass element having a fluorescent detection surface;

at least one magazine for receiving said fluorescent dosemeter;

a magazine conveying device for conveying one of magazines sent one by one to a predetermined take-out position;

a fluorescent dosemeter take-out device for taking the fluorescent dosemeter from the magazine which is located in a take-out position;

a fluorescent glass element setting device for setting the fluorescent glass element from the taken-out fluorescent dosemeter to a predetermined measuring position;

dose measuring device for subjecting the fluorescent glass element which is set to the measuring position to an ultraviolet ray and for measuring an intensity of fluorescent light emitted from the fluorescent glass element excited; and radiation dose controlling device for controlling a radiation dose level based on identification information read out by said identifying read-out means and measurement data measured by said dose measuring device, said radiation dose controlling device including memory device for storing the identification information and said measured data and arithmetic processing means for performing an arithmetic processing on the stored information and measured data.

The system further comprises dose quality evaluation means comprising an energy compensation filter having an opening in a predetermined position on said fluorescent dosemeter and a plurality of diaphragms having a varying opening area of said fluorescent detection surface at an area corresponding to the opening area of said filter.

The system further comprises fluorescent glass element replacing means which, when a radiation dose level is found by a radiation dose controlling system to be in excess of a predetermined level, replaces said fluorescent glass element with a new one.

BRIEF DESCRIPTION OF THE DRAWINGS

FIGS. 1 to 9 show a radiation dose measuring system according to one embodiment of the present invention in which:

FIG. 1 is a perspective view diagrammatically showing an external appearance of such a whole system;

FIGS. 2A and 2B are a front and a side view, respectively, showing a magazine-supplying device;

FIG. 3 is a partial, cross-sectional view showing a magazine-moving device;

FIG. 4 is a partial, cross-sectional view showing a magazine-lifting device;

FIG. 5 is a cross-sectional view showing a dosemeter taking-out device;

FIG. 6 is a perspective, exploded view showing the dosemeter;

FIGS. 7A and 7B are a plan and a side view showing a lower capsule-drawing device;

FIGS. 10 to 14 show a system according to a second embodiment of the present invention in which:

FIG. 10 is a perspective view showing a holder with a diaphragm not mounted thereon;

FIGS. 11 and 12 are a perspective view showing a holder with a different diaphragm mounted thereon;

FIGS. 13 and 14 are graphs, respectively, showing a relative sensitivity and a relative sensitivity ratio using a different diaphragm; and FIGS. 15 to 18 are a system according to another embodiment of the present invention in which:

FIG. 15 is a perspective view showing a capsule code on a dosemeter;

FIG. 16 is a diagrammatic view showing a positional relation among a capsule code read-out section, a dose measuring section and an index hole;

FIG. 17 is a system configuration diagram for controlling a dose level per individual; and FIG. 18 is a flowchart showing the operation of the system.

DETAILED DESCRIPTION OF THE PREFERRED EMBODIMENTS

Figure 1:
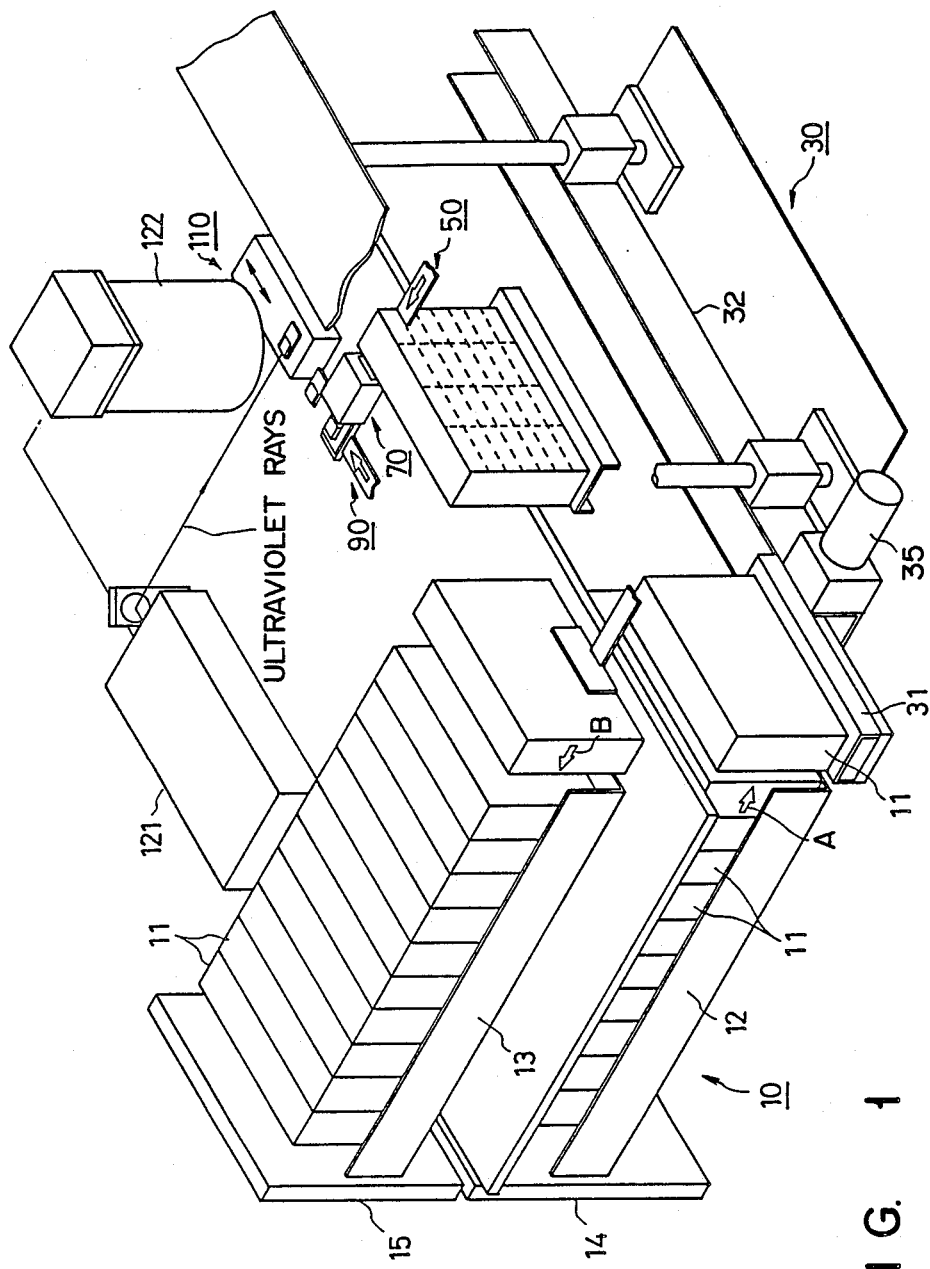

One embodiment of the present invention will now be described with reference to the accompanying drawings. FIG. 1 is a perspective view of the system according to this embodiment, as viewed slantwise from the back. As is shown in this figure, the system for measuring radiation doses comprises magazine-exchanging device 10, magazine-transporting device 30, dosemeter-pushing device 50, lower capsule-drawing device 70, holder-setting device 90 and radiation dose measuring means 110. Magazine-exchanging device 10 receives magazines, one at a time. Each magazine contains, for example, 50 dosemeters each comprising an upper capsule and a lower capsule. Magazine-transporting device 30 transports the magazine from magazine-exchanging device 10 to a prescribed position. Dosemeter-pushing device 50 pushes the dosemeters, one by one, from the back of the magazine transported to the prescribed position by magazine-transporting device 30. Lower capsule-drawing device 70 draws the lower capsule of each dosemeter pushed from the magazine. The lower capsule contains a glass holder. Holder-setting device 90 removes the glass holder from the lower capsule and moves it to the position where a radiation dose will be measured from the glass element contained in the glass holder. Radiation dose measuring means 110 measures a radiation dose from each glass element moved to this position, while calibrating the glass element. In FIG. 1, numeral 121 designates an $N_2$ gas laser for emitting ultraviolet rays for exciting the glass elements, and numeral 122 denotes a photomultiplier tube located above the glass element moved to said position, for measuring the intensity of the fluorescent light emitted from the fluorescence detection surface of each glass element.

Components 10, 30, 50, 70, 90, and 110 will be described in more detail. Magazine-exchanging device 10 has lower rack 12 and upper rack 13, on which a number of magazines 11 are mounted. Magazines 11 put on lower rack 12 are supplied, one by one, in the direction of arrow A to magazine-transporting device 30, by means of a magazine-supplying mechanism (shown in FIG. 2), so that the radiation doses may be measured from the glass dosemeters contained in each magazine 11. Magazines 11 put on upper rack 13 are supplied, one by one, in the direction of arrow B from magazine-transporting device 30, also by the magazine-supplying mechanism, after the radiation doses have been measured from the glass dosemeters contained in each magazine 11. Numerals 14 and 15 represent the front panels of racks 12 and 13, respectively.

As is shown in FIGS. 2A and 2B, the magazine-supplying mechanism has L-shaped brackets 16 and 17 which are located at the opposite ends of lower rack 12, respectively. Screw shaft 18 extends between these brackets 16 and 17. Guide shafts 19 and 20 also extend between brackets 16 and 17, parallel to screw shaft 18. Numerals 21 an 22 denote bearings connected to brackets 16 and 17 and supporting guide shafts 19 and 20. Numeral 23 designates a block in screw engagement with screw shaft 18, and can move back and forth, while being guided by guide shafts 19 and 20, when screw shaft 18 rotates. Magazine pusher 24, which is adapted to push magazines 11 on lower rack 12, is fixed to block 23. Numeral 25 represents motor for rotating screw shaft 18, thereby to supply magazines 11. Numeral 26 denotes a coupling connecting screw shaft 18 to the shaft of motor 25. Therefore, in the magazine-supplying mechanism, every time the shaft of motor 25 rotates at a prescribed timing through a predetermined angle or a predetermined number to times, magazine pusher 24, which is attached to block 23 put in screw engagement with shaft 18, moves for the distance equal to the depth of magazines 11, thereby pushing one magazine 11 from rack 12 and transferring it to transport table 31 which is a part of magazine-transporting device 30.

Figure 3:
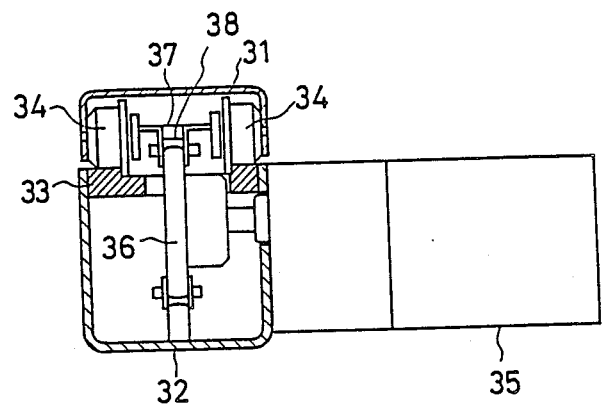

Magazine-transporting device 30 is provided with a magazine-moving unit for horizontal moving each magazine supplied by the magazine-supplying mechanism, and a magazine-lifting unit for lifting the magazine to an elevated position. As is shown in FIG. 3, the magazine-moving unit has trough-shaped path 32 for horizontal moving magazines 11, a pair of rails 33 laid on the inner surfaces of the side walls of path 32, and a pair of rollers 34 rotatably mounted on rails 33, respectively. Within trough-shaped path 32, sprocket 36 for horizontal moving magazines 11 is provided and can be rotated by motor 35. This sprocket 36 is in mesh with roller chain 38 suspended from attachment 37 which extends between rollers 34 and couples these rollers 34. Thus, every time motor 35 rotates at a prescribed timing through a predetermined angle or a predetermined number of times, sprocket 36 is rotated, whereby platform 31, which is connected to roller chain 38 by attachment 37, is moved for the distance equal to the depth of magazines 11.

Figure 4:
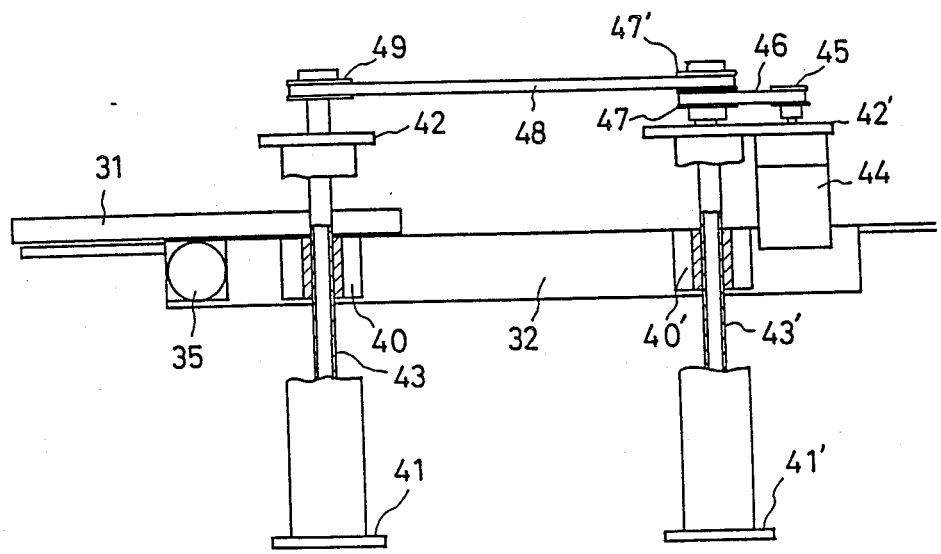

As is illustrated in FIG. 4, the magazine-lifting unit comprises female-screw bearings 40 and 40', lower brackets 41 and 41' set apart for a predetermined distance, upper brackets 42 and 42' also set apart for a predetermined distance, and screw shafts 43 and 43' supported by brackets 41, 41', 42 and 42' and supported by female-screw bearings 40 and 40'. Motor 44 for lifting magazines 11 is attached of upper bracket 42'. Pulley 45 is mounted on the shaft of this motor 44. Pulleys 47 and 47' are mounted on screw shaft 43'. Timing belt 46 is wrapped around pulleys 45 and 47, thus rotating screw shaft 43' when motor 44 rotates. Pulley 49 is mounted on screw shaft 43, and timing belt 48 is wrapped around pulley 47' and 49, thus rotating screw shaft 43 when motor 44 rotates, and pulley 47' is thus rotated. As both screw shafts 43 and 43' are rotated, platform 31 is moved up and down.

Figure 5:
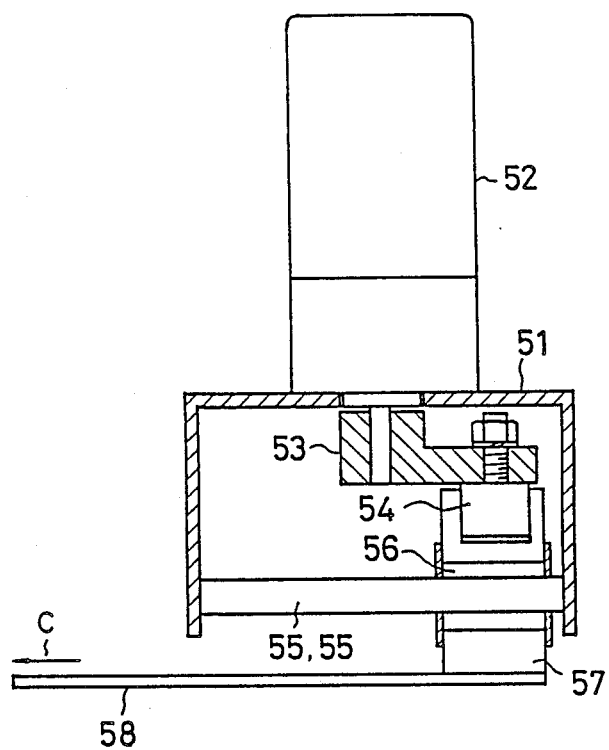

As is shown in FIG. 5, dosemeter-pushing device 50 comprises bracket 51 in the form of an inverted trough, motor 52 mounted on the outer surface of the top of bracket 51, and L-shaped arm 53 coupled to the shaft of motor 52. Cam follower 54 is fastened to the tip of arm 53. Two rods 55 extend parallel between the vertical walls of trough-shaped bracket 51. Bearings 56 is mounted on these rods 55, respectively. Block 57 is supported by bearings 56, and thus located between rods 55. Pusher 58 is secured at one end to the lower surface of block 57. When the shaft of motor 52 rotates, arm 53 is rotated, whereby cam follower 54 moves block 57 along rods 55. As a result, pusher 58 is moved in the direction of arrow C (FIG. 5), that is, from the back of magazine 11 toward the front thereof, thereby pushing one of the dosemeters out of magazine 11.

Each magazine 11 is shaped like a box, and is open at both the front and back, as is illustrated in FIG. 1. It has lattice-shaped rack (represented by broken lines) for supporting dosemeters. Each dosemeter 60 has such a structure as is shown in the exploded view of FIG. 6. Dosemeter 60 comprises glass holder 61 and glass element 62 held by one end portion of glass holder 61. Index holes 63, which form an identification code for glass holder 61, are cut in the other end portion of holder 61. Glass holder 61 is orientated in the direction of arrow A and held within lower capsule case 64. Numeral 65 is a trapezoidal recess cut in the front of case 64. Another trapezoidal recess (not shown) of a different size is cut in the back of case 64. Numeral 66 denotes two slide projections formed on the sides of lower capsule case 64. Lower capsule case 64 is moved in the direction of arrow E and inserted into upper capsule case 67. Numeral 68 designate to straight grooves cut in the inner surfaces of the vertical walls of upper capsule case 67. Slide projections 66 are slidably fitted in grooves 68 when lower capsule case 64 is inserted in upper capsule case 67. A leaf spring (not shown) is fastened, at one end, to the ceiling of upper capsule case 67. A magnetic block (not shown) is attached to the other end of the leaf spring. The leaf spring is usually biased toward lower capsule case 64, and is thus locked by lock member 69 provided on lower capsule case 64. When a magnet is positioned close to upper capsule case 67, it attracts the magnetic block, thereby releasing the leaf spring from lock member 69.

Figure 6:
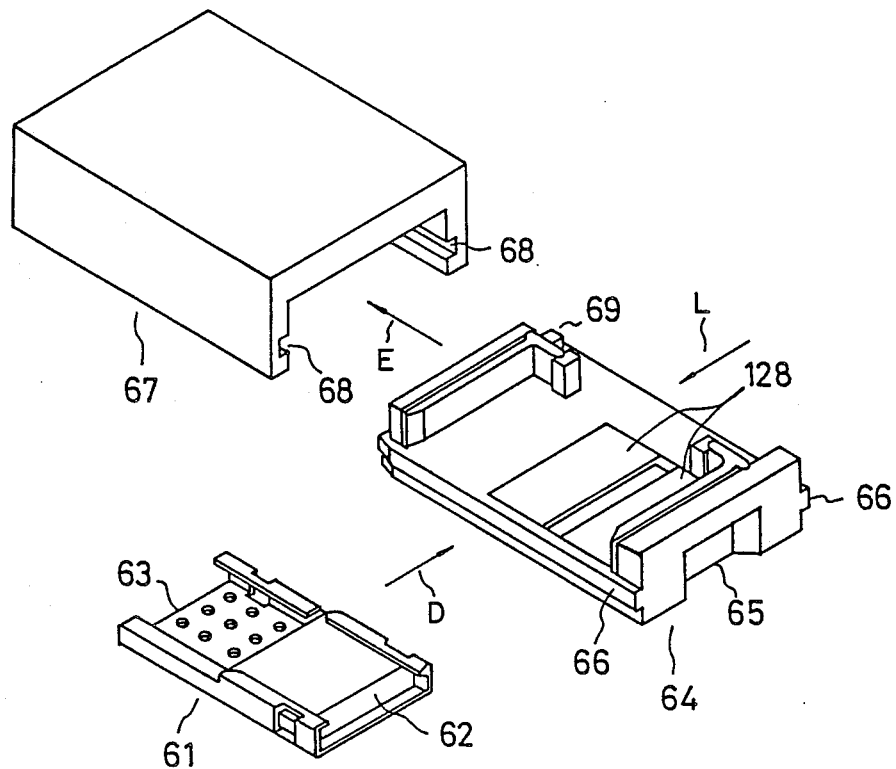

Lower capsule-drawing device 70 has such a specific structure as is shown in FIGS. 7A and 7B, for drawing lower capsule case 64 of dosemeter 60 shown in FIG. 6. FIG. 7A is a plan view of device 70, and FIG. 7B is a side view, as is seen in the direction of arrow F in FIG. 7A. As is shown in FIGS. 7A and 7B, lower capsule-drawing device 70 comprises bracket 71 and solenoid 72 fixed to bracket 71. When dosemeter 60 has been pushed by device 50 in the direction of arrow G and set at the position indicated by broken lines in FIG. 7A, solenoid 72 is released, thus making a spring push finger 73 in the direction of arrow H as is shown in FIG. 7B. Finger 73 is, therefore, fitted into the recess cut in that inner surface of the front end of lower capsule case 64, said recess facing away from recess 65. Numeral 74 designates a magnet fitted in a hole made in capsule guide 75, for attracting the magnetic block (not shown). Numeral 76 denotes motor secured to bracket 77. Arm 78 is coupled to the shaft of this motor 76. Cam follower 79 is attached to the tip of arm 78, and fitted in trough-shaped guide rail 81 laid on sliding table 80. When the shaft of motor 76 rotates after finger 73 has been fitted into lower capsule case 64, sliding table 80 is moved from the right to the left in FIG. 7A, whereby only lower capsule case 64, which holds glass holder 61, is drawn from dosemeter 60, and is eventually mounted on capsule table 82. Numeral 83 represents a projection which is fitted in recess 65 of lower capsule case 64.

Figure 8A:
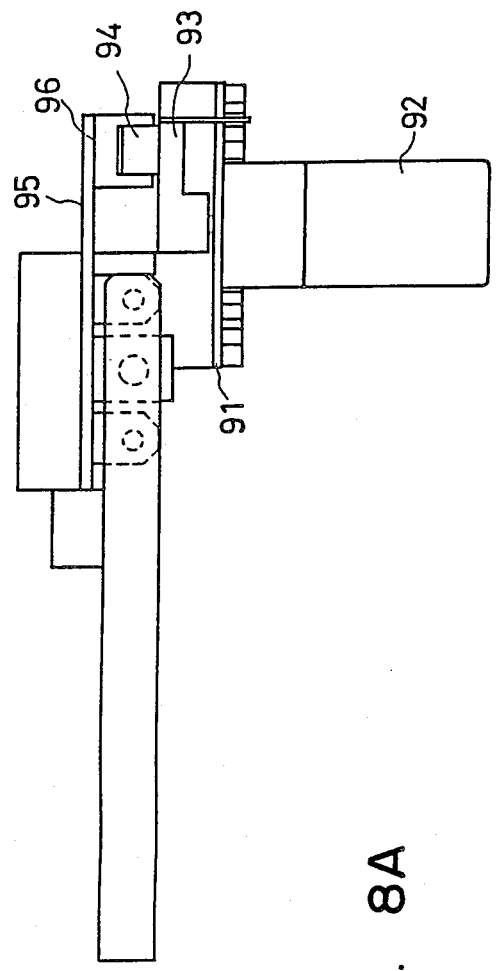
FIGS. 8A and 8B are a plan and a front view, respectively, showing a holder-setting device.
Figure 8B:
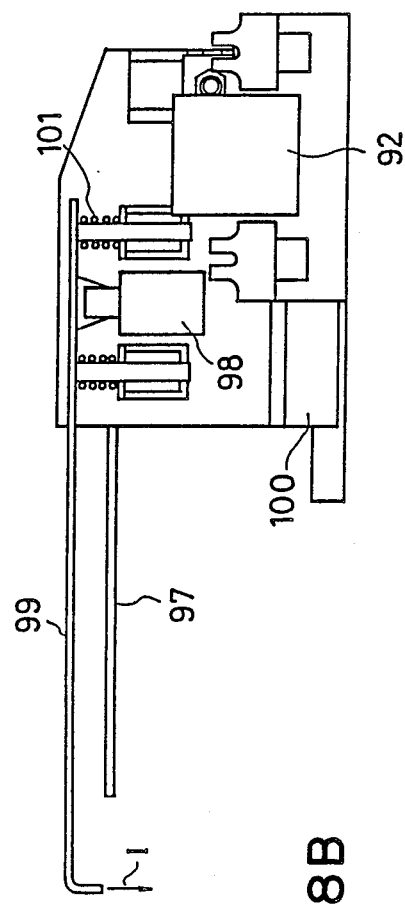

Holder-setting device 90 has the structure shown in FIGS. 8A and 8B which are a plan view and a front view, respectively. As is illustrated in these figures, holder-setting device 90 comprises bracket 91 and motor 92 attached to bracket 91. Arm 93 is coupled, at one end, to the shaft of motor 92. Cam follower 94 is fastened to the other end of arm 93. When the shaft of motor 92 rotates, pusher 97 is thrust, being guided by guide rail 96 mounted on bracket 95, thus moving glass holder 61 from lower capsule case 64 and setting holder 61 on radiation dose measuring means 110. Numeral 98 represents a solenoid, which is driven to lower finger 99 in the direction of arrow I after a radiation dose has been read from dosemeter 60. Finger 99 therefore moves dosemeter 60 on sliding table 100, and loads dosemeter 60 back into lower capsule case 64. Numeral 101 designates a spring.

Figure 9A:
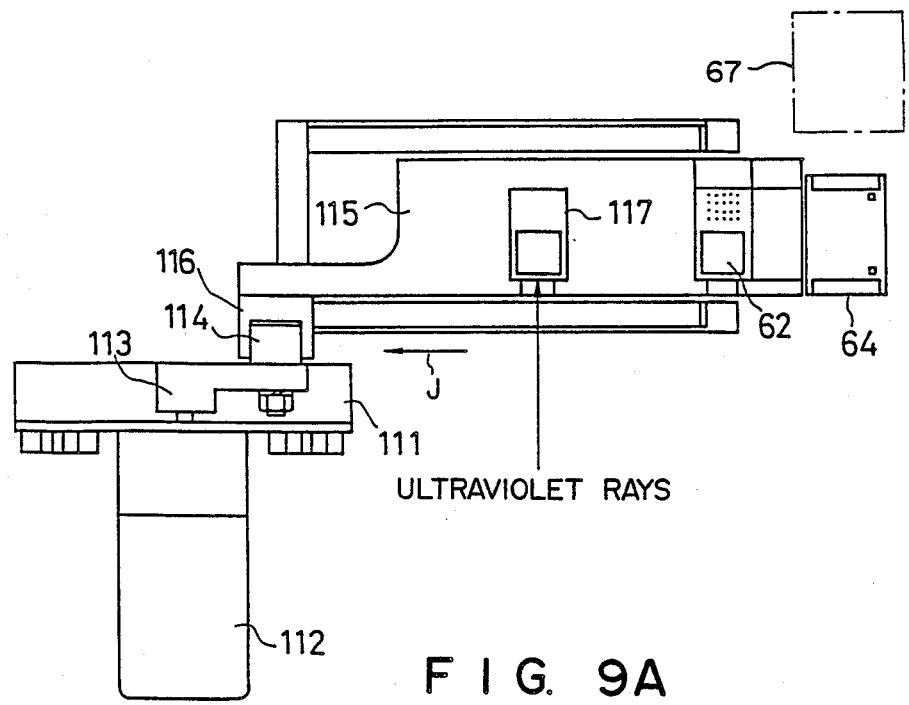
FIGS. 9A and 9B, each, are a plan view showing a replacing device for explaining a replacement to be made between a measuring fluorescent glass element and a glass element for calibration
Figure 9B:
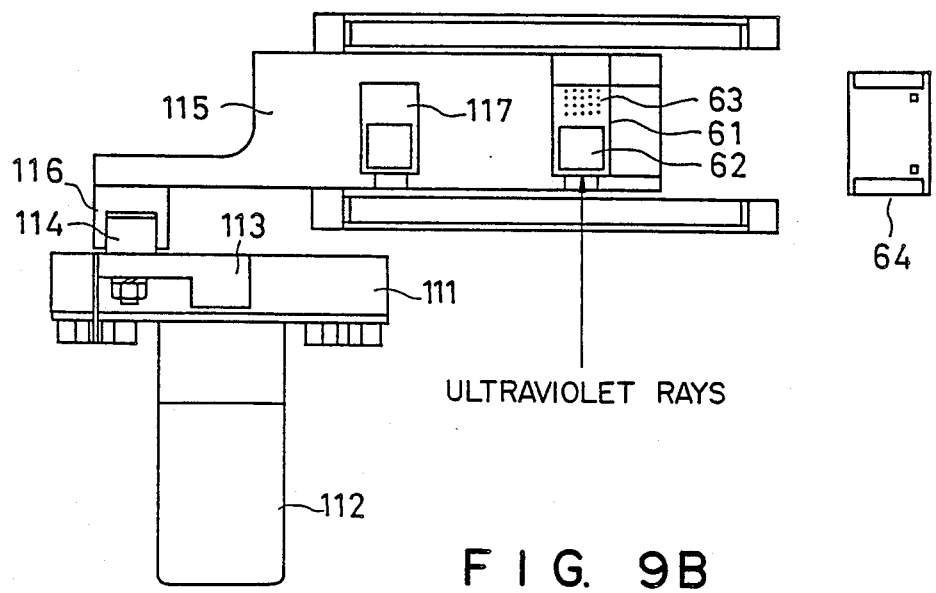

As is shown in FIGS. 9A and 9B, radiation dose measuring means 110 is provided with calibration means. More specifically, motor 112 is attached to bracket 111. Arm 113 is coupled, at one end, to the shaft of motor 112. Cam follower 114 is fastened to the other end of arm 113. Cam follower 114 is engaged with guide rail 116 on which sliding table 115 can move in the direction of arrow J. Numeral 117 denotes a calibration fluorescent element. Radiation dose measuring means 110 is operated in the following manner. While radiation doses are not being measured from glass elements 62, motor 112 is rotated, thereby moving sliding table 115 to the position shown in FIG. 9A. As a result, a calibration fluorescent element 117 is located at a position, where ultraviolet rays are applied to fluorescent element 117. Calibration signals are read from this element 117. Then, motor 112 is driven, further moving sliding table in the direction of arrow J to the position shown in FIG. 9B. As a result, glass element 62 held by glass holder 61 is located at a position, where ultraviolet rays are applied from $N_2$ gas laser 121 to glass element 62, thus exciting glass element 62. Photomultiplier tube 122, which is arranged above the fluorescence detection surface of glass element 62, measures the radiation dose from glass element 62. The radiation dose thus measured is corrected in accordance with the calibration signals.

Generally, the calibration of the electric circuit including photomultiplier tube 122 is indispensable to the measurement of radiation doses. To measure radiation doses from a great number of dosemeters, one after another, a plurality of calibration fluorescent elements for generating calibration signals must be used. Every time radiation doses have been measured from a plurality of glass elements, one calibration fluorescent element is selected from among the many, and a calibration radiation dose is measured from this selected calibration fluorescent element. The calibration radiation dose is compared with the radiation dose measured from any glass element, thereby to correct the radiation dose of the glass element. The use of different calibration fluorescent elements gives rise to some problems. First, the radiation doses of all glass elements cannot be correctly measured. Secondly, it is difficult to identify each calibration fluorescent element. Thirdly, it takes much time to perform the calibration process. In contrast, the calibration means of the apparatus according to the present invention is advantageous in the following respects. First, it can automatically produce calibration signals by moving sliding table 115 while radiation doses are not being measured from glass elements 62. Secondly, it can continuously measure radiation doses from the glass elements since calibration signals are obtained immediately before measuring the radiation dose from each glass element. Thirdly, it can, therefore, serve to reduce the time required in correcting the radiation doses measured from glass elements 62. Further, the calibration error, if any, can be decreased since only one calibration fluorescent element is used.

Figure 9C:
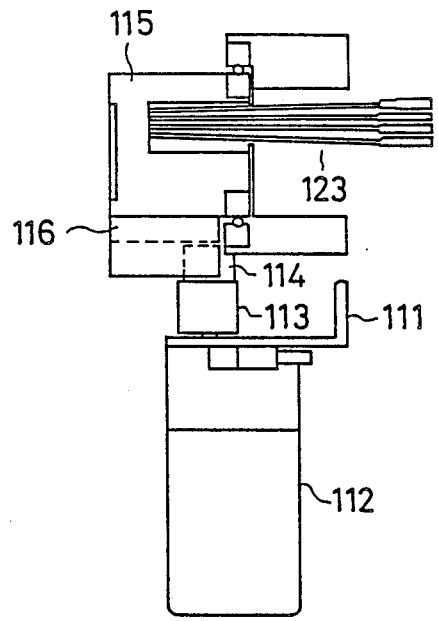
FIG. 9C is a side view showing a code-readout section for an index hole.

FIG. 9C shows a device having glass fibers 123. The light beams passing through index holes 63 of glass holder 61 are guided by the glass fibers and optically read, thereby to identify the person who has carried the radiation dosemeter or the place where the dosemeter has been set.

The operation of the system described above will now be explained. First, the magazine-supplying mechanism (FIGS. 2A and 2B) of magazine-exchanging device 10 is operated, thus supplying magazines 11, one by one, to magazine-transporting device 30. More specifically, motor 25 is driven, thus rotating coupling 26 and screw shaft 18. As a result, block 23, which is mounted on screw shaft 18 and guide shafts 19, moves forward for the predetermined distance. As block 23 moves in this way, pusher 24 moves in the direction of arrow K, and pushes rearmost magazine 11 from lower rack 12 onto transport table 31 of magazine-transporting device 30. The magazine-supplying mechanism starts supplying each magazine 11, upon receipt of a timing signal generated after radiation dose measuring means 110 has measured the radiation doses from all dosemeters 60 pulled out from one magazine, after these dosemeters have been stored back into the magazine, and this magazine has been supplied to upper rack 13.

Thereafter, when motor 35 of magazine-transporting device 30 is driven, sprocket 36 fixed to the shaft of motor 35 is rotated. Roller chain 38 engaged with sprocket 36, and attachment 37, move transport table 31, on which magazine 11 is mounted, forward along rail 33 for a predetermined distance. While transport table 31 is moved forward, or after this table 31 has been moved for the predetermined distance, motor 44 of the magazine-lifting unit is driven. Troughlike path 32, which is in screw engagement with screw shafts 43 and 43', is moved up and down. That is, the magazine-moving unit shown in FIG. 3 and the magazine-lifting unit shown in FIG. 4 are used to move each magazine horizontally and vertically, thereby transporting dosemeters 60 contained in the magazine to the predetermined position where dosemeters 60 can be pushed out of the magazine by means of dosemeter-pushing device 50.

Then, after magazine 11 has been transported to the predetermined position, motor 52 of dosemeter-pushing device 50 is driven. As this motor 52 is driven, cam follower 54 which is fixed to the tip of arm 53 coupled to the shaft of motor 52, moves in an arc. Therefore, block 57 supported on two rods 55 moves pusher 58 for the predetermined distance in the direction of arrow C. Pusher 58 pushes dosemeter 60 from magazine 11 into capsule guide 75 of lower capsule-drawing device 70 (FIGS. 7A and 7B) which is located in front of magazine 11. After dosemeter 60 has been inserted into capsule guide 75, solenoid 72 is released. Finger 73 is thus moved by the spring in the direction of arrow H, i.e., the direction perpendicular to the plane of the drawing of FIG. 7A, and is fitted into the recess of lower capsule case 64. In this condition, the magnetic block fixed to the tip of the leaf spring secured to the ceiling of upper capsule case 67 is attracted to magnet 74 attached to a specific portion of capsule guide 75, and contacts upper capsule case 67 against the force of the leaf spring. As a result, the magnetic block is released from lock member 69 of lower capsule case 64. Thereafter, when motor 76 is driven, sliding table 80 moves from the right to the left for the predetermined distance. Solenoid 72 and finger 73 simultaneously move, thus drawing lower capsule case 64 only, out of capsule guide 75 and then mount this case 64 on capsule table 82.

After lower capsule case 64 has been put on capsule table 82, holder-setting device 90, which is shown in FIGS. 8A and 8B, is operated. More specifically, motor 92 of holder-setting device 90 is driven, whereby sliding table 100 moves to the left from the position shown in FIGS. 8A and 8B. Hence, pusher 97 supported by bracket 95 moves forward, thus pushing glass holder 61 from lower capsule case 64 in the direction of arrow L (FIG. 6). Glass holder 61 is thereby set at the predetermined position on sliding table 115 which is a part of radiation dose measuring means 110 shown in FIG. 9.

After glass holder 61 has been set on sliding table 115 in this way, the light beams passing through index holes 63 are detected by optical fibers 123. Then, motor 112 is driven, and sliding table 115 is linearly moved in the direction of arrow J for the predetermined distance, thereby setting glass holder 61 to the position where calibration fluorescent element 117 has received ultraviolet rays. In other words, holder 61 is located at the radiation dose measuring position. $N_2$ gas laser 121 radiates ultraviolet rays to glass element 62 held by glass holder 61. Photomultiplier tube 122 measures the intensity of the fluorescent light emitted from fluorescence detection surface of glass element 62, thus determining the radiation exposure dose. After the radiation exposure dose has been measured, selenoid 98 of holder-setting device 90 is magnetized, thereby lowering finger 99 in the direction of arrow I. Finger 99 hooks a glass holder 61 and transports it back on the lower capsule case 64. Then, device 70 is operated such that it connect lower capsule case 64 with upper capsule case 67, and device 50 inserts dosemeter 60 into magazine 11. After dosemeter 60, which has been subjected to the process of measuring radiation dose, has been stored back into magazine 11, both the magazine-moving unit and the magazine-lifting unit are operated, thereby moving magazine 11 in a prescribed direction. Then, the next dosemeter 60 is located at the prescribed position. At this position, this dosemeter 60 is pushed out of magazine 11 by means of dosemeter-pushing device 50. All other dosemeters 60 are pushed from magazine 11, subjected to the process of measuring radiation dose, and stored back into magazine 11. Thereafter, the magazine-supplying mechanism is operated, thus supplying magazine 11 to upper rack 13. Then, magazine-supplying mechanism supplies the next magazine 11 to dosemeter-pushing device 50.

As has been explained above, magazine-transporting device 30 transports a plurality of magazines 11, one by one, to dosemeter-pushing device 50. Then, dosemeter pushing device 50 pushes a predetermined number of dosemeters 60, one by one, from each magazine 11 transported by device 30. Dosemeters 60 are then supplied, one by one, to lower capsule-drawing device 70. Device 70 releases lower capsule case 64 of each dosemeter 60, from upper capsule case 67 thereof. Then, holder setting device 90 pushes glass holder 61 from lower capsule case 64 of each dosemeter 60, and set holder 61 at a prescribed position, where the radiation dose is measured from the glass element held in glass holder 61. Dosemeters 60 contained in each magazine 11 can, therefore, sequentially undergo the process of measuring radiation doses. Further, since devices 90, 70, 50 and 30 can be reversely operated, dosemeters 60 subjected to the process of measuring radiation exposure doses can be stored back into magazine 11. Hence, magazines, each containing a prescribed number of dosemeters 60, can be automatically exchanged, and the radiation doses can be measured from the dosemeters contained in any magazine. In addition, once magazine 11 containing dosemeters 60 has been placed on lower rack 12, dosemeters 60 can be automatically pulled out of this magazine 11, and the radiation doses can be automatically measured from these dosemeters 60. Moreover, owning to the automatic processing of dosemeters 60, the contamination of the glass elements can be reduced, thereby to raise the accuracy of measuring radiation doses.

In the embodiment described above, holder-setting device is operated after lower capsule case 64 has been drawn from dosemeter 60, and then glass holder 61 is transferred onto radiation dose measuring means 110. However, if the radiation dose can be measured from glass element 62 at the position where lower capsule has been drawn from dosemeter 60, glass holder 61 can be measured at the same position.

Hitherto, a spherical holder case, i.e., a hollow spherical filter having holes and containing a glass element, has been used to compensate for the dependency of energy upon $\gamma$-rays and X-rays in measuring the radiation doses of glass elements. (Refer to Japanese Utility Model Publication No. 48-29192.) This holder case has sufficient dosimetrical characteristics. However, it has some drawbacks. First, the glass elements cannot be automatically pulled from the holder case so that the fluorescent light emitted from these elements may be detected. Secondly, radiation doses of a great member of glass elements cannot be quickly measured. Thirdly, since the holder case is spherical or cylindrical, it is unstable and hard to be carried with. Japanese Patent Publication No. 50-5595 discloses a method of measuring the energy of $\gamma$-rays or X-rays. In this method, a thin ultraviolet light beam is applied to a glass element, thereby to obtain the difference in intensity between the fluorescent light beams emitted from some different depths within the glass element, and the photon energy is estimated from the intensity difference thus obtained. It is impossible with this method to measure the radiation dose quickly.

Figure 10:
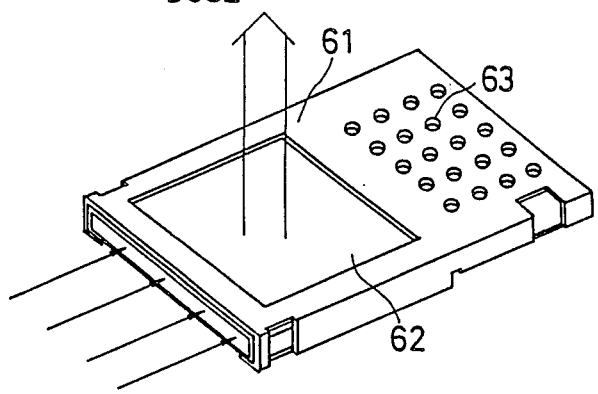
Figure 13:
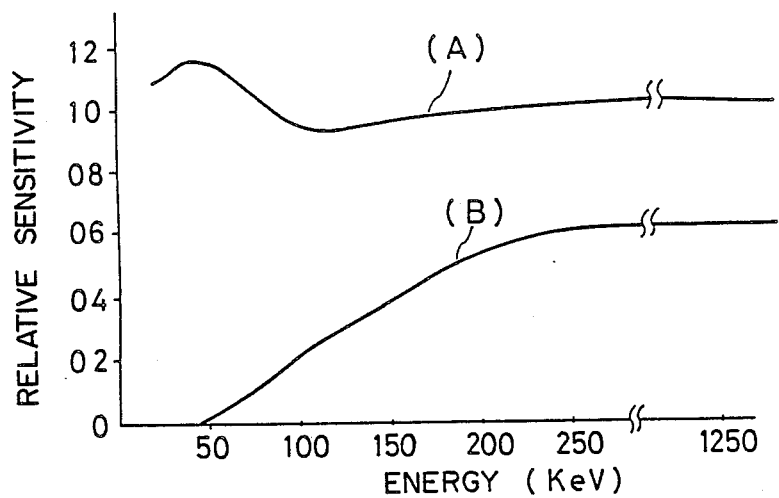
Figure 14:
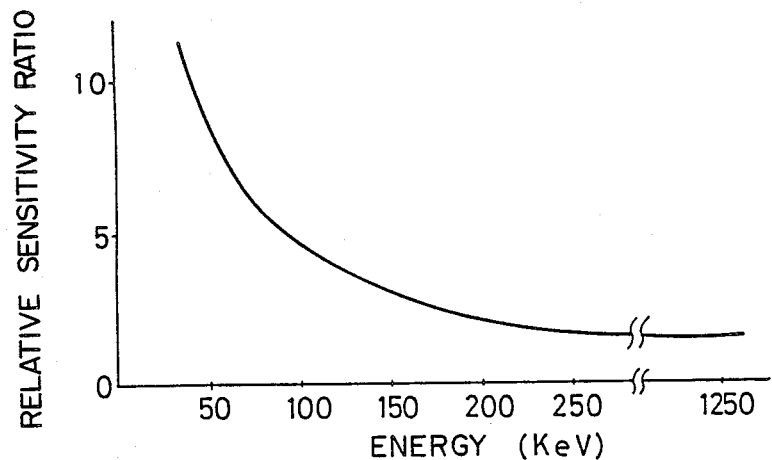

These drawback inherent in the spherical or cylindrical holder case are not found in cases 64 and 67 used in this invention, both shown in FIG. 6, provided with lock means and adapted to contain glass holder 61 holding glass element 62. Since cases 64 and 67 are substantially hexahedrons, they are easy for persons to carry with. In addition, glass holder 61 can easily be drawn out of cases 64 and 67, and the radiation dose can be quickly measured from glass element 62. Furthermore, cases 64 and 67 can be used in combination with the radiation dose measuring means shown in FIG. 10 to 11 in order to evaluate the radiation dose of glass element 62. As is shown in FIG. 10, excitation ultraviolet rays are applied to one narrow side of glass holder 61. Photomultiplier tube 122 measures the amount of the fluorescent light emitted from that broad surface of holder 61 which is perpendicular to the ultraviolet rays. If a diaphragm 126 having a large square opening is inserted between glass element 62 and photomultiplier tube 122, the radiation dose of glass element 62 can be evaluated. Further, if diaphragm 126 shown in FIG. 11 and having one square opening, and diaphragm 127 shown in FIG. 12 and having two rectangular openings, are alternately inserted between glass element 62 and photomultiplier tube 122, the energy of $\gamma$-rays and X-rays can be evaluated. Diaphragm 126 is designed to detect the amount of almost all fluorescent light emitted from glass element 62, whereas diaphragm 127 is designed to detect the amount of the fluorescent light emitted from only those portions of glass element 62 which have been irradiated with $\gamma$-rays and X-rays applied through an Sn filter (e.g., filter 128 shown in FIG. 6). FIG. 13 is a graph representing relative sensitivity curves, i.e., so-called "energy dependency" curves, recorded when a specific amount of $\gamma$-rays or X-ray is applied to glass element 62. FIG. 14 is a graph illustrating the ratio of the relative sensitivity of curve (A) (FIG. 13) to the relative sensitivity of curve (B) (FIG. 13). The energy of the $\gamma$-rays, and the energy of the X-rays can be estimated from the graph of FIG. 14.

A holder magazine-supplying mechanism, which is similar to the magazine-supplying mechanism, can be provided for supplying magazines containing glass holders. Further, a holder-inserting/drawing device can be provided for inserting a glass holder into a holder magazine and drawing it from the holder magazine. The holder magazine-supplying mechanism and the holder-inserting/drawing device can cooperate to automatically exchange the glass holders.

When it is determined by a data control means (later described) that the radiation exposure dose measured from the glass element held in a glass holder surpasses a predetermined tolerance, the holder-inserting/drawing device is operated, thereby inserting the glass holder into the holder magazine. Then, the magazine-moving unit and the magazine-lifting unit are operated, thus moving the holder magazine in a prescribed direction, and a new glass holder is set at the position where the holder-inserting/drawing device is located. This device draws the new glass holder from the holder magazine and moves it to the dose measuring position.

Thereafter, the the magazine-moving unit and the magazine-lifting unit are further operated, thereby returning magazine 11 to the position where the magazine was located at the start of the measuring of the radiation dose. Then, holder-setting device 90 moves up the new glass holder onto lower capsule case 64. Devices 70 and 50 are operated reversely, thereby inserting the dosemeter into magazine 11.

Owing to the use of the holder magazine-supplying mechanism and the holder-inserting/drawing device, glass holders can be automatically taken out from the dosemeters and insert them into all dosemeters, and can be automatically exchanged.

A second embodiment of the present invention will now be described with reference to FIGS. 15 to 18. As is shown in FIG. 6, index holes 63 for identifying glass element 62 are cut in the wall of glass holder 61, which faces away from the wall on which glass element 62 is mounted. As is shown in FIG. 15, capsule code 130, i.e., a code section for identifying the capsule (i.e., the dosemeter), is formed on the outer surface of lower capsule case 64. An identification code-reading means is provided for reading the data defined by index holes 63 and capsule code 130, and a data control means is provided for managing the data representing radiation exposure dose.

Figure 17:
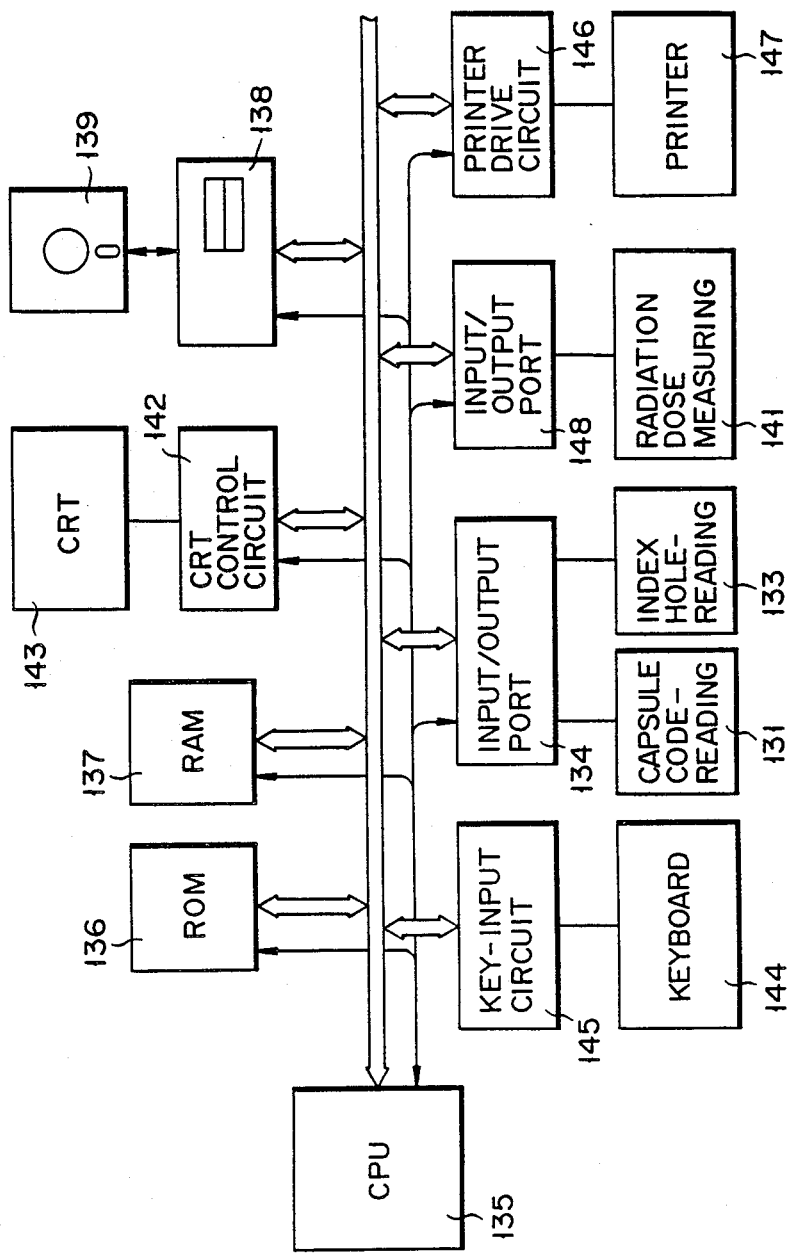

As is shown in FIG. 16, the identification code reading means comprises capsule code-reading section 131, index hole-reading section 133, and input/output port 134. Capsule code-reading section 131 is located below dosemeter 60 pushed out of magazine 11. Index hole-reading section 133 is designed to read a code from index holes 63 of glass holder 61 set on sliding table 115 by means of holder-setting device 90. As is illustrated in FIG. 17, the data control means comprises central processing unit 135 (hereinafter referred to as "CPU"), ROM 136, and RAM 137. If necessary, the data control means further comprises disk drive unit 138 and floppy disk 139. The codes read by sections 131 and 133 are stored into RAM 137 or recorded on floppy disk 139. Input/output port 134 has, if necessary, a A/D converter or a memory. CPU 135 can process data in accordance with the specific programs which are stored in ROM 136 or recorded on floppy disk 139.

The data control means stores the data representing radiation exposure doses in accordance with the codes read by the identification code-reading means, and processes this data, thereby forming desired control data. The data control means includes radiation dose measuring section 141. Radiation dose measuring section 141 comprises a photomultiplier tube, an integration circuit, and an A/D converter circuit. The photomultiplier tube converts an amount fluorescent light into an electric signal and amplifies this signal. The integrating circuit integrates the electric signal output from the photomultiplier tube. The A/D converter circuit converts the output of the integrating circuit to digital data. In FIG. 17, numeral 142 designates a CRT control circuit, numeral 143 represents a CRT, numeral 144 denotes a keyboard, numeral 145 designates a key-input circuit, numeral 146 denotes a printer-driving circuit, numeral 147 designates a printer, and numeral 148 denotes an input/output port for supplying the data representing the radiation dose measured from an glass element.

Figure 18:
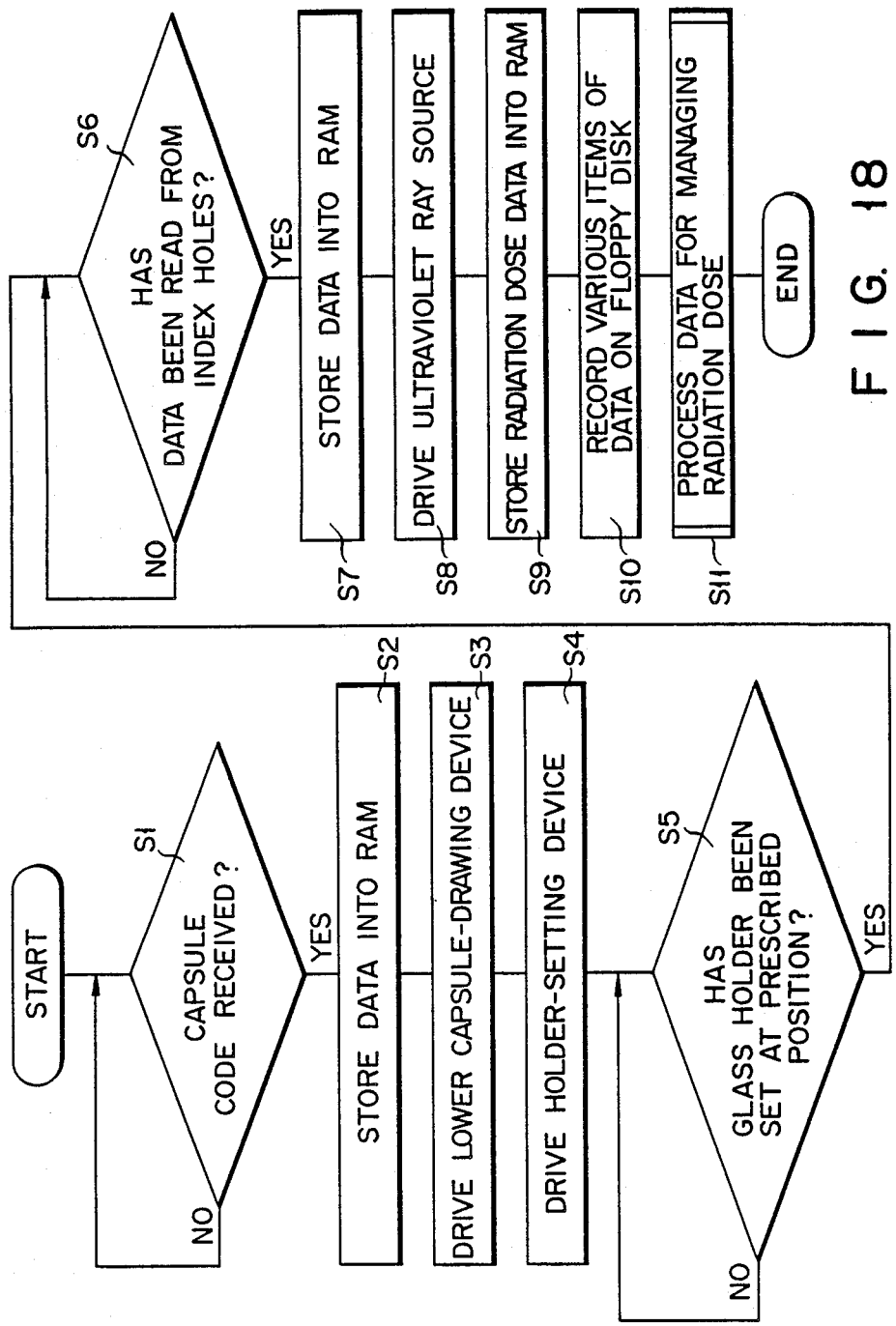

The operation of the second embodiment described above will now be explained. Magazines 11 contains 50 dosemeters 60 each. They are supplied, one by one, from the magazine-supplying mechanism. Any magazine 11 supplied from this mechanism is transported by magazine-transporting device 30 to a predetermined position. At this position, dosemeter-pushing device 50 pushes dosemeters 60, one by one, from magazine 11. The magazine-supplying mechanism, magazine-transporting device 30, and the dosemeter-pushing device 50 are operated with a specific timing, in response to the control signals supplied from CPU 135. After a dosemeter 60 has been set at the position where the lower capsule case is to be drawn out by lower case-drawing device 70, CPU determines whether or not capsule code 130 must be read, in step Sl (FIG. 18). If YES, CPU stores the data read by reading section 131 into RAM 137, in step S2 (FIG. 18).

Thereafter, magnet 74 is moved toward dosemeter 60, thereby unlocking dosemeter 60. An operation command is given to lower capsule-drawing device 70 in step S3, whereby lower capsule case 64 is moved from upper capsule case 67. Then, in step S4, an operation command is given to holder-setting device 90, whereby glass holder 61 is pushed out of lower capsule case 64 and set at the predetermined position on sliding table 115. In step S5, CPU 135 determines whether or not glass holder 61 has been set at the predetermined position. If YES, CPU 135 determines, in step S6, whether or not the code has been read from index holes 63. In the next step S7, the code data, thus read, is stored into RAM 137.

Then, glass holder 61 is transported to the code-reading position or the radiation dose measuring position. In step S8, the ultraviolet ray source is driven, thus generating ultraviolet rays. The ultraviolet rays are applied to glass element 62 held on holder 61, thereby exciting glass element 62. As a result, glass element 62 emits fluorescent light. In step S8, CPU 135 stores takes the output data of radiation dose measuring section 141 through input/output port 148. In step S9, CPU 135 stores this output data into RAM 137. In step S10, capsule code 130, the code defined by index holes 63, and the radiation dose of glass element 62 are recorded o floppy disk 139, as data for managing the radiation exposure of the person who has carried dosemeter 60 on his body. Thus, various pieces of data have been recorded, such as the current reading of radiation dose, the previous reading of radiation dose, the initial value of radiation dose, the date of the present reading, the date of the previous reading, the code read from index holes 63 (i.e., the code identifying the glass element), the capsule code, and all radiation dose accumulated in each dosemeter. In step S11, these data pieces are processed whenever desired, at predetermined time intervals, or upon reading the radiation dose from any dosemeter, thereby obtaining the radiation doses accumulated in the person, the radiation dose he or she has received during a specific period, and the similar data. Of these items of data obtained, those which must be checked are printed by printer 147 or displayed by CRT 143.

In the second embodiment of the present invention, index holes 63 are cut in each glass holder 61, and capsule code 130 is provided on each dosemeter 60. Code-reading sections 131 and 133 are provided for reading the code from index holes 63 and capsule code 130 provided on dosemeter 60. Hence, the various pieces of data about the radiation doses, which any person has received until the current reading of a radiation dose, can be retrieved, processed, and printed or displayed, whereby the radiation exposure doses of the person can be managed. If each person carries the same dosemeter 60 on his body while working in the place where he or she is liable to be exposed to radiation, all radiation doses accumulated in this dosemeter 60 are identical to the total amount of radiation the person has been exposed to during his or her all working hours in the past. Therefore, if the capsule code of his or her dosemeter 60 is identical to his or her ID number, dosemeter 60 can be used as the ID card. In this case, the ID card can be dispensed with.

Figure 11:
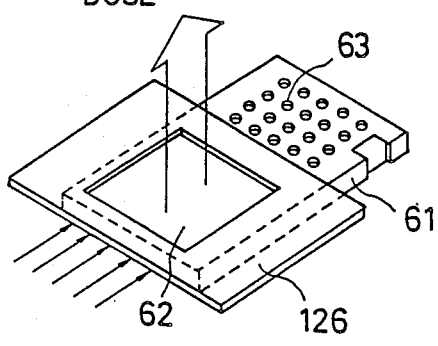
Figure 12:
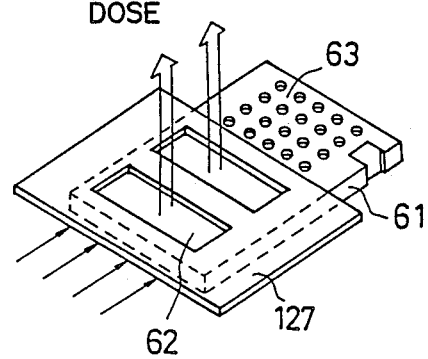

Also in the second embodiment, similarly to the first embodiment, only one diaphragm similar to the one (126) shown in FIG. 11 can be inserted between glass element 62 and photomultiplier tube 122 in measuring the radiation dose from glass element 62, or two diaphragms similar to those (126 and 127) shown in FIGS. 11 and 12 can be alternately inserted between glass element 62 and tube 122 in estimating the energy of γ-rays and X-rays.

In the data control means, the data representing the upper limit to which each glass element can accumulate radiation can be recorded. In this case, when the radiation accumulated in glass element 62 reaches this upper limit, glass holder 61 containing this element 62 is removed from lower capsule case 64 positioned at the radiation dose measuring position, and another holder 61 containing a new glass element is inserted into case 64. Hence, the radiation dose can be continuously measured.

If the data representing the upper limit to which each glass element can accumulate radiation doses is recorded, it is possible to continuously measure the radiation exposure dose received by any person who has carried dosemeter 60 on his body, by replacing glass element 62 with a new one when the radiation accumulated in element 62 reaches the upper limit of accumulated radiation. This helps to enhance the accuracy of the measuring of radiation doses, and makes it possible to manage the radiation exposure of the persons who are liable to exposed to radiation during work. Further, if such a person carries the same dosemeter 60 on his body, the energy dependency and direction dependency of the dosemeter can be maintained at specific values, and the radiation exposure dose of this person can be checked every day, every week or every year, for all time he works in places where he is liable to receive radiation.

What is claimed is:

1. A radiation dose measuring system for measuring a radiation dose with an intensity of fluorescent light emitted due to an excitation of a fluorescent glass element on a fluorescent dosemeter which is exposed with a radiation, said system comprising:
   a fluorescent dosemeter including a fluorescent glass element having a fluorescent detection surface, a glass holder having an opening through which said fluorescent detection section is subjected to an exposure and holding the fluorescent glass element, and a capsule for holding the glass holder, said capsule comprising an inner case slidably receiving or withdrawing the glass holder and an outer case slidably receiving the inner case to allow it to be detachably mounted thereon;
   at least one magazine capable of receiving a required number of fluorescent dosemeters, said magazine being divided into a predetermined number of segments and the fluorescent dosemeter being adapted to be received in the respective segment;
   a magazine conveying device for allowing a predetermined segment of one of magazines fed one by one to be located in a predetermined position;
   a fluorescent dosemeter take-out device for taking the fluorescent dosemeter from the segment of the magazine located in a take-out position and for returning it back to the magazine;
   a fluorescent glass element setting device which, in the taken fluorescent dosemeter, moves the fluorescent glass element to permit it to be located in a predetermined measuring position; and
   a dose measuring means for subjecting the fluorescent glass element, which is set in a measuring position, to an ultraviolet ray and for measuring an intensity of fluorescent light emitted from the fluorescent glass element excited.

2. The system according to claim 1, further comprising:
   dose quality evaluation means including an energy compensation filter having an opening in a predetermined position on said fluorescent dosemeter and detection plane defining means for variably varying an opening area of said fluorescent detection surface at an area corresponding to the opening of said filter.

3. The system according to claim 1, further comprising:
   dose measurement calibrating means including a reference fluorescent glass element for calibration; and
   replacing means for replacing the fluorescent glass element of said fluorescent glass dosemeter with the reference fluorescent glass element in a predetermined measuring position.

4. A radiation dose measuring system for measuring a radiation dose with an intensity of fluorescent light emitted due to an excitation by an ultraviolet ray in a fluorescent element on a fluorescent dosemeter, said system comprising:
   a fluorescent dosemeter including an identifying section for recording an identification information, said fluorescent dosemeter including a fluorescent glass element having a fluorescent detection surface;
   at least one magazine for receiving said fluorescent dosemeter;
   a magazine conveying device for conveying one of magazines sent one by one to a predetermined take-out position;
   a fluorescent dosemeter take-out device for taking the fluorescent dosemeter from the magazine which is located in a take-out position;
   a fluorescent glass element setting device for setting the fluorescent glass element from the taken-out fluorescent dosemeter to a predetermined measuring position;
   dose measuring means for subjecting the fluorescent glass element which is set to the measuring position to an ultraviolet ray and for measuring an intensity of fluorescent light emitted from the fluorescent glass element excited; and
   radiation dose controlling means for controlling a radiation dose level based on identification information read out by said identifying read-out means and measurement data measured by said dose measuring means, said radiation dose controlling means including memory means for storing the identification information and said measured data and arithmetic processing means for performing an arithmetic processing on the stored information and measured data.

5. The system according to claim 4, further comprising dose quality evaluation means comprising an energy compensation filter having an opening in a predetermined position on said fluorescent dosemeter and detecting plane defining means for variably varying an opening area of said fluorescent detection surface at an area corresponding to the opening area of said filter.

6. The system according to claim 4, further comprising fluorescent glass element replacing device which, when a radiation dose level is found by said radiation dose controlling system to be in excess of a predetermined level, replaces said fluorescent glass element with a new one.

* * * * *